(12) United States Patent
Choo et al.

(10) Patent No.: US 7,962,950 B2
(45) Date of Patent: Jun. 14, 2011

(54) SYSTEM AND METHOD FOR FILE SYSTEM MANDATORY ACCESS CONTROL

(75) Inventors: Tse Huong Choo, Bristol (GB); Scott Alan Leerssen, Atlanta, GA (US); Joubert Berger, Atlanta, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1342 days.

(21) Appl. No.: 09/896,019

(22) Filed: Jun. 29, 2001

(65) Prior Publication Data

US 2003/0009685 A1    Jan. 9, 2003

(51) Int. Cl.
    *G06F 17/30*    (2006.01)
(52) U.S. Cl. .......................................................... 726/2
(58) Field of Classification Search ........... 713/164–166
    See application file for complete search history.

(56) References Cited

U.S. PATENT DOCUMENTS

| | | | | |
|---|---|---|---|---|
| 4,984,272 A * | 1/1991 | McIlroy et al. | ................. | 726/17 |
| 5,720,033 A * | 2/1998 | Deo | .............................. | 713/200 |
| 5,778,222 A * | 7/1998 | Herrick et al. | ................. | 707/702 |
| 5,802,590 A * | 9/1998 | Draves | .......................... | 711/164 |
| 6,023,765 A * | 2/2000 | Kuhn | ................................ | 726/4 |
| 6,038,563 A * | 3/2000 | Bapat et al. | ........................... | 1/1 |
| 6,044,467 A * | 3/2000 | Gong | ................................ | 726/4 |
| 6,047,377 A * | 4/2000 | Gong | ................................ | 726/21 |
| 6,202,066 B1* | 3/2001 | Barkley et al. | ................. | 707/785 |
| 6,408,298 B1* | 6/2002 | Van et al. | ............................. | 1/1 |
| 6,928,466 B1* | 8/2005 | Bulka et al. | .................... | 709/213 |
| 2002/0026592 A1* | 2/2002 | Gavrila et al. | ................. | 713/201 |
| 2002/0107874 A1* | 8/2002 | DeLorme et al. | ............. | 707/200 |
| 2002/0186260 A1* | 12/2002 | Young | ........................... | 345/853 |
| 2004/0158722 A1* | 8/2004 | Carpenter | ...................... | 713/182 |

FOREIGN PATENT DOCUMENTS

| | | |
|---|---|---|
| EP | 0 768 594 A1 | 4/1997 |
| EP | 0926605 A1 * | 6/1999 |
| WO | WO 02/50644 A2 | 6/2002 |
| WO | WO 02/061552 A1 | 8/2002 |
| WO | WO 02/061553 A1 | 8/2002 |
| WO | WO 02/061554 A1 | 8/2002 |

OTHER PUBLICATIONS

Deitel (H.M. Deitel, "Operating Systmes", 2nd edition, 1990, ISBN: 0201180383).*
Sobell (Mark G. Sobell, "A practial guide to the UNIX system", 3rd edition, 1995, ISBN: 0805375651).*
Hadfield et al. (Lee Hadfield, Dave Hater, Dave Bixler, "Windows NT Server 4 Security Handbook", 1997, ISBN: 078971213).*
Microsoft (Jumes et al., Windows NT 4.0 Seucurity, Audit, and Control, 1999, ISBN: 157231818-X), p. 151.*
Dalton et al. (Chris Dalton and Tse Choo, "An operating system approach to securing e-services", Communications of the ACM, vol. 44, No. 2, Feb. 2001).*

(Continued)

*Primary Examiner* — Peter Poltorak

(57) ABSTRACT

In one embodiment, the present invention is related to a computer system including compartments implemented on an operating system. A database contains access rules with the access rules defining which compartments are authorized to access particular file resources. A kernel module receives a system call to access a file from a user space application belonging to a compartment. A security module determines whether the user space application is authorized to access the file utilizing access rules stored in the database.

6 Claims, 2 Drawing Sheets

OTHER PUBLICATIONS

Hadfield et al. (Lee Hadfield, Dave Hater, Dave Bixler, "Windows NT Server 4 Security Handbook", 1997, ISBN: 078971213), pp. 84,153-154,194-198, 200.*

Minasi (Mark Minasi, "Mastering Windows NT Server 4" 6th edition, 1999, ISBN: 0782124453) and MicrosoftSupport ("Default NTFS Permissions in Windows NT", Q148437), p. 521-522.*

MicrosoftSupport ("Default NTFS Permissions in Windows NT", Q148437), http://support.microsoft.com/default.aspx?scid=KB;EN-US;Q148437&ID=KB;EN-US;Q148437.*

MicrosoftPress ("Supporting Microsoft Windows NT Server in the Enterprise", 1998, ISBN: 1572317108), p. 698.*

CSFY, "Windows NT4 Explorer: The File System, How items are placed and located", Department of Computing Science University of Alberta, http://www-csfy.cs.ualberta.ca/tutorials/Windows_Explorer/File_system/.*

Expert-Exchange ("Default NTFS Permissions in Windows NT", Feb. 1998).*

Donald V. Miller and Robert W. Baldwin, Access Control by Boolean Expression Evaluation, IEEE 1990.*

Stallings (William Stallings, "Cryptography and network security", 2th edition, 1998, ISBN: 0138690170) , p. 527-529.*

Deitel (Harvey M. Deitel, An Introduction to Operating Systems, ISBN: 0201180383, 1990), p. 400-401 and 576-577.*

Hewlet-Parkard Virutal Vault "Administrator's Guide," HP Part No. B5413-90061, Release A.04.50, E0401, printed 2001, pp. ii-xii, and 1-224, Available online at http://docs.hp.com/hpux/pdf/B5413-90061.pdf.

Hewlett-Packard Trusted Solaris Administration Overview, Chapter 3, "Administering Trusted Networking,"—Dec. 2000, pp. 71-78. Available online at http://docs.sun.com/ab2/coll.175.4/TRSOLADMINOV/@Ab2PageView/4120?Ab2Lang=C&Ab2Enc=820-8859-1.

Hewlett-Packard Trusted solaris Administration Overview, Chapter 4, "Administering Auditing,"—Dec. 2000, pp. 87-99. Available online at http://docs.sun.com/ab2/coll.175.4/TRSOLADMINOV/@Ab2PageView/5573?Ab2Lang= C&Ab2Enc = iso-8859-1.

HP Praesidium VirtualVault "Concepts Guide," HP Part No. B5413-90051, Release A.04.00, E1199, printed 199, pp. ii-viii, and 1-82. Available on-line at http://docs.hp.com/hpux/pdf/B5413-90051.pdf.

Sun Microsystems "Trusted Solaris Audit Administration," Trusted Solaris 8, Sun Microsystems Part No. 805-8121-10, Dec. 2000, pp. 1-342. Available on-line at http://docs.sun.com/ab2/coll.175.4/TRSOLAUDADMIN/@Ab2TocView?AAb2Lang = C&Ab2Enc = iso-8859-1.

Sun Microsystems "Compartmented Mode Workstation Labeling: Encodings Format," Sun Microsystems Part No. 805-8123, Dec. 2000, pp. 1-176. Available on-line at http://docs.sun.com/ab2/coll.175.4/TRSOLLBLADMIN/@Ab2TocView?Ab2Lang = C&Ab2Enc = iso-8859-1.

Lin A & Brown R, "The application of security policy role-based access control and the common data security architecture," Computer Communications, v23, n17, pp. 1584-1593, Nov. 2000, ISSN 0140-3664.

Foreign Search Report under Section 17, Jan. 13, 2003.

Sun Microsystems "Trusted Solaris User's Guide," Sun Microsystems Part No. 805-8115-10, Dec. 2000, pp. 1-133. Available on-line at http://docs.sun.com/ab2/coll.175.4/TRSSUG/@Ab2TocView?Ab2Lang = C&Ab2Enc = iso-8859-1.

* cited by examiner

SYSTEM AND METHOD FOR FILE SYSTEM MANDATORY ACCESS CONTROL

This application is related to concurrently filed and commonly assigned U.S. patent application Ser. No. 09/896,385 filed Jun. 29, 2001, entitled, "SYSTEM AND METHOD FOR MANAGEMENT OF COMPARTMENTS IN A TRUSTED OPERATING SYSTEM," which is hereby incorporated herein by reference.

TECHNICAL FIELD

The present invention is directed to a system and method for computer containment and more particularly to a system and method for restricting access to files by processes.

BACKGROUND

Containment refers to restrictions on a computer system which prevent user-space applications from performing certain actions. In particular, containment is achieved by forcing a large untrusted application to utilize a smaller trusted application to perform certain actions. By forcing the larger application to do so, the smaller application may ensure that the larger application does not perform undesirable actions, such as interfering with other applications.

One aspect of containment is restricting access to files. For example, it may be advantageous to restrict access to a configuration file, since the configuration file may be utilized to breach the security of the system. Likewise, it is advantageous to prevent most processes from being able to read or write to files containing password information.

To restrict access to files, known trusted operating systems associate access information with each file stored on a file system. Specifically, the file structure is modified to include an additional permission data structure with each file. The permission data structure contains essentially a list of identifiers with each identifier specifying a group of processes that are allowed to access the respective file. When a process attempts to access a particular file, the process performs a system call to the kernel. The identifier of the process is obtained by the kernel routine associated with the system call. The kernel routine accesses the file by reading the list of identifiers. A logical comparison is made between the identifier received from the process and the list of identifiers. If a match is found, the kernel routine performs the access operation (e.g., opening the file). If no match is found, the kernel routine does not perform the access operations and, instead, returns an exception (e.g., error message).

Although associating such a data structure with each file does restrict certain processes from accessing certain files, this approach is problematic in many respects. First, the amount of permission data is large, because file systems of ordinary complexity typically contain thousands of files. Secondly, the task of synchronizing permission data with file creation and file deletion is challenging. For example, many processes may create and delete files during their operation. If permission data is created or modified for each file operation, system performance is significantly degraded. Moreover, if permission data is also maintained by a system administrator, system administration is quite cumbersome when the number of files exceeds a small number.

It shall be appreciated that associating the additional data structure with each file causes the file system format to be incompatible with other file system formats. In particular, this approach is incompatible with the file system formats utilized by traditional UNIX operating systems. Thus, once data is stored in the above format, well-known applications and utilities cannot be utilized with the preceding access limiting file structure.

SUMMARY OF THE INVENTION

In one embodiment, the present invention is related to a computer system including compartments implemented on an operating system. A database contains access rules with said access rules defining which compartments are authorized to access particular file resources. A kernel module receives a system call to access a file from a user space application belonging to a compartment. A security module determines whether said user space application is authorized to access said file utilizing access rules stored in said database.

DETAILED DESCRIPTION

Figure 1:
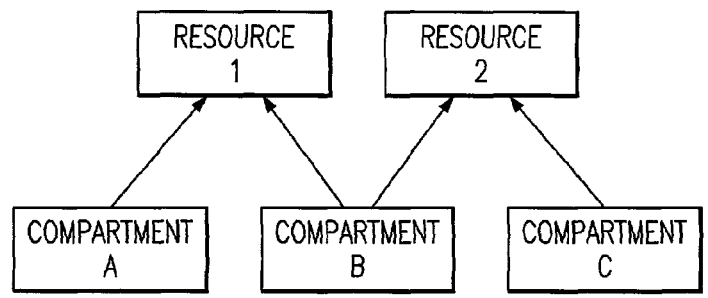
FIG. 1 depicts a block diagram example of compartments according to the prior art.

Compartments refer to groups of processes or threads which are limited to accessing certain subsets of system resources of a computer system. FIG. 1 depicts a block diagram example of compartments. This system includes two subsets of system resources (resource 1 and resource 2). This system also includes three compartments (designated compartments A, B, and C). Compartment A is only permitted to access the system resources associated with resource 1. Compartment C is only permitted to access the system resources associated with resource 2. Compartment B is permitted to access the system resources associated with both resource 1 and resource 2. As an example, if a process is designated as belonging to compartment A, the process would be allowed to access resource 1 but would be prevented from accessing resource 2.

According to embodiments of the present invention, by utilizing compartments, the security of a computer system may be enhanced through mandatory access control. Mandatory access control refers to access control that a process cannot override. By utilizing mandatory access control, a breach of security in one compartment will not effect resources associated with another compartment. Specifically, if the security of an application operating in compartment A is compromised, the breach of security is limited to a subset of system resources. For example, resource 1 may include system resources associated with receiving TCP/IP packets without including system resources used to send TCP/IP packets. Instead, the system resources used to send TCP/IP packets may be assigned to resource 2. If an application in compartment A is compromised by a buffer-overflow attack, the application could not be utilized to launch a denial of service attack against another web-resource. The application could not launch such an attack, since it is not permitted to access system resources associated with sending TCP/IP packets.

In embodiments of the present invention, any number of system resources may be organized according to compartment access control. For example, system resources associated with TCP/IP networking, routing tables, routing caches, shared memory, message queues, semaphores, process/thread handling, and user-id (UID) handling may be limited by utilizing compartments according to embodiments of the present invention.

Figure 2:
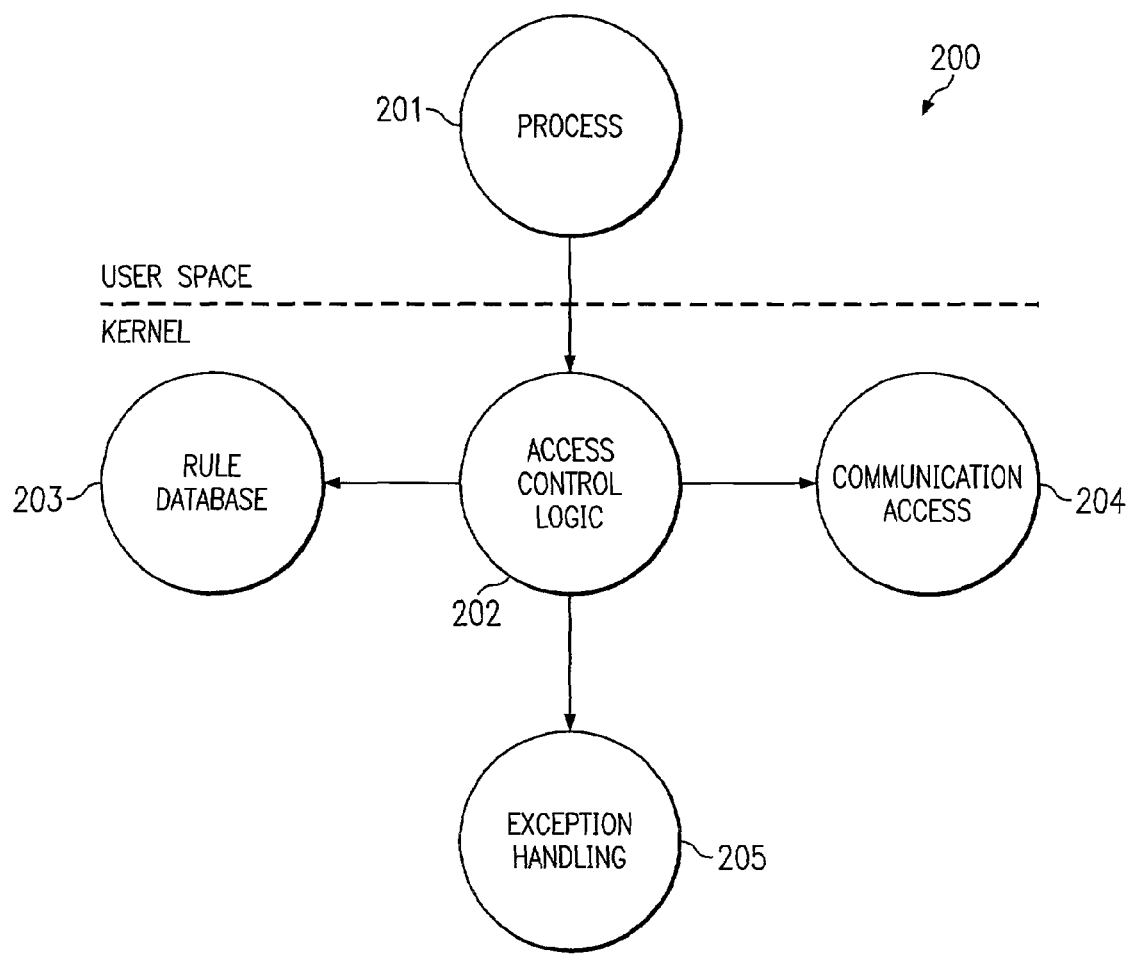
FIG. 2 depicts an exemplary system that utilizes compartments to provide containment according to embodiments of the present invention.

FIG. 2 depicts exemplary system 200 that illustrates how compartments may be implemented according to embodiments of the present invention. System 200 includes process 201 that is associated with a compartment. Process 201 executes code in user-space, i.e. a hardware-enforced operating mode that limits the operations of process 201. Process 201 may include code that is operable to attempt to access a protected resource (e.g., opening a certain file) according to a compartment scheme. Process 201 performs a system call to the kernel of the operating system. The system call includes transferring control to access control logic 202. Access control logic 202 receives a compartment identifier or tag of process 201. Access control logic 202 utilizes the compartment identifier to search rule database 203 to determine whether the compartment associated with process 201 is permitted access to the particular resource. If access is permitted by the rules contained in rule database 203, access control logic 202 transfers processing control to communication access module 204 that performs the software operations to access the resource. If access is not permitted, access control logic 202 transfers processing control to exception handling module 205. Exception handling module 205 may return an exception (e.g., an error message) to process 201 and/or it may stop the operations of process 201.

Figure 3:
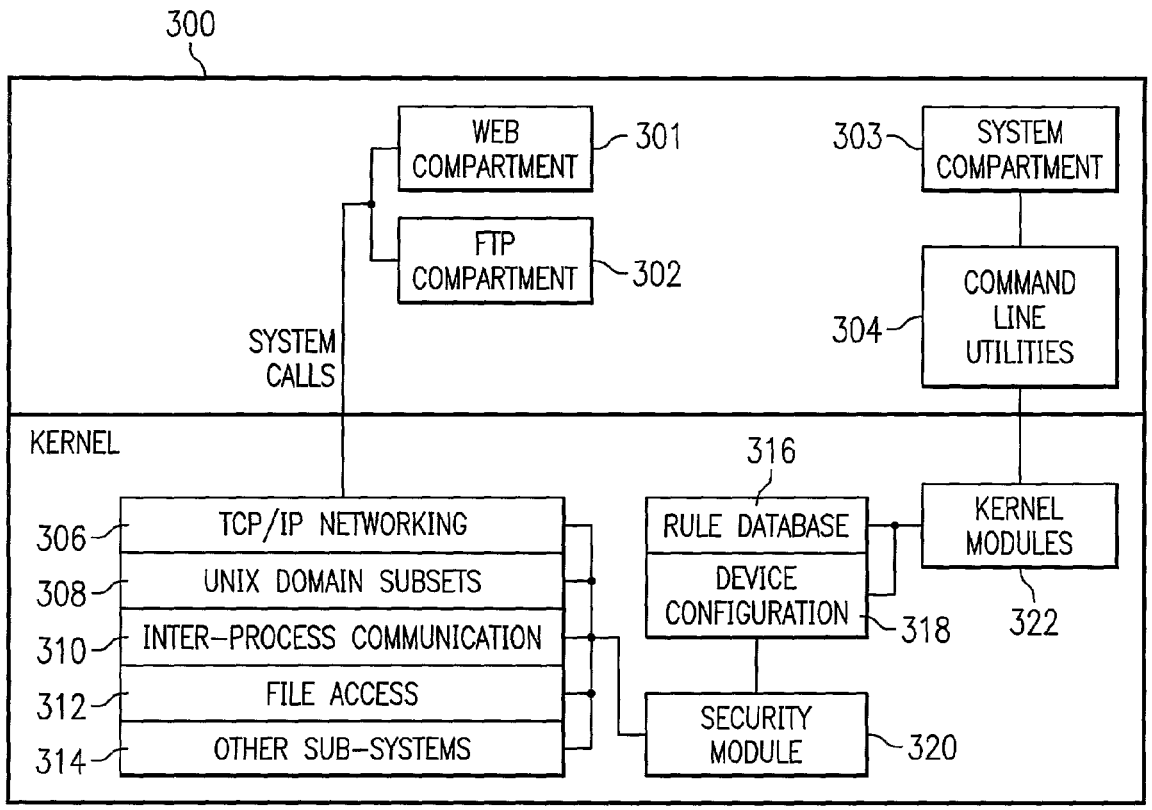
FIG. 3 depicts another exemplary system that utilizes compartments to provide containment according to embodiments of the present invention.

System 300 of FIG. 3 depicts another exemplary system that utilizes compartments to provide containment. System 300 includes a plurality of compartments. In this example, WEB compartment 301, FTP compartment 302, and SYSTEM compartment 303 are shown. Each compartment is associated with various executing processes or threads. The processes of the compartments are limited to accessing system resources according to the rules stored in rule database 316. Rule database 316 may include various components or modules for the various types of resources. Rule database 316 may comprise separate tables for TCP/IP networking resource rules and for file system resource rules. Also, the various components may be stored in different locations. For example, TCP/IP resource rules may be stored in random access memory while file system resource rules may be stored on the file system.

SYSTEM compartment 303 may include processes that facilitate command line utilities 304 to modify the compartments or rules associated with the compartments. Command line utilities 304 may include commands to create or delete a particular compartment. Command line utilities 304 may further include commands to create, delete, and/or modify the rules stored in rule database 316 that limit access to system resources.

Command line utilities 304 may further include commands to execute a process in a specific compartment. For example, a command may be utilized to execute an HTTP web server application in WEB compartment 301. The command causes a thread to be created. The command also creates an entry in the thread registry of the kernel (not shown). The thread is associated with a unique identifier. Also, the thread is associated with the identifier of WEB compartment 301. When the particular thread makes systems calls to the kernel to access system resources, the kernel utilizes the unique thread identifier to determine the compartment identifier. The kernel then determines whether the particular thread is authorized to access the requested resource. It shall be appreciated that this approach is quite advantageous, because this approach requires no modification to the application being executed. Thus, the exemplary compartment approach described herein allows the security of ordinary platforms to be upgraded to include access control without requiring appreciable modification of user-space application code.

Figure 4:
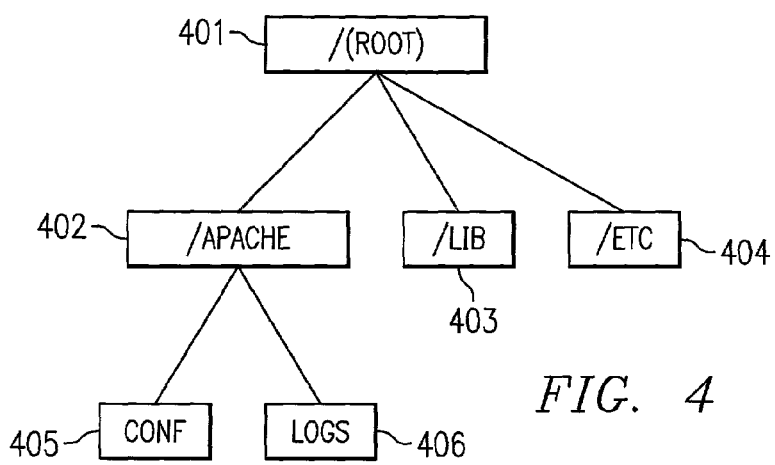
FIG. 4 depicts an exemplary file system to which access is restricted according to embodiments of the present invention.

In the example of FIG. 4, command line utilities 304 access the kernel via kernel modules 322. Routines of kernel modules 322 advantageously perform the actual manipulation (e.g., addition, modification, or deletion) of the respective objects as desired by the particular commands. Further examples of compartment manipulation via command line utilities are disclosed in U.S. patent application Ser. No. 09/896,385 filed Jun. 29, 2001, entitled, "SYSTEM AND METHOD FOR MANAGEMENT OF COMPARTMENTS IN A TRUSTED OPERATING SYSTEM," which has been incorporated herein by reference.

The kernel of system 300 includes a plurality of modules. Certain modules are accessed by the various compartments via system calls. For example, processes operating in either WEB compartment 301 or FTP compartment 302 may communicate with processes operating on other systems via the Internet by utilizing system calls to routines of TCP/IP networking module 306. Socket communication may occur via UNIX domain sockets module 308. Interprocess communication module 310 includes kernel routines to facilitate communication between processes via shared memory, stacks, semaphores, and/or the like. Interprocess communication module 310 may also facilitate spawning or forking new processes. File access module 312 may facilitate access to files on a file system. For example, file access module 312 may facilitate opening, closing, reading from, writing to, deleting, renaming files, and/or the like. Other kernel modules may be provided via other subsystems module 314.

Each of the kernel modules advantageously interacts with security module 320. Security module 320 enforces the compartment scheme to prevent unauthorized access to system resources. Security module 320 utilizes device configuration module 318 and rule database 316 to facilitate compartment limitations. Security module 320 is capable of determining which resources are available to system 300 via device configuration module 318. Security module 320 further receives identification of a compartment and identification of a system resource to be accessed from a routine of a kernel module. Security module 320 searches rule database 316 to locate an applicable rule. Security module 320 permits or disallows access upon the basis of an applicable rule, or upon the basis of a default rule if no applicable rule is located.

It shall be appreciated that system 300 is an exemplary system. The present invention is not limited to any particular compartment or containment scheme. Specifically, numerous approaches may be utilized to prevent processes belonging to a compartment from accessing system resources. For example, access control may be implemented at the user-level via several techniques. A strace( ) mechanism may be utilized to trace each system call of a given process. The strace( ) mechanism examines each system call and its arguments. The strace( ) mechanism either allows or disallows the system call according to rules defined in a rule database. As another example, system call wrapping may be utilized. In system call wrapping, wrapper functions, using a dynamically linked shared library, examine system calls and arguments. The wrapper functions also either allow or disallow system calls according to rules defined in a rule database. User-level authorization servers may be utilized to control access to system resources. User-level authorization servers may control access to system resources by providing a controlled data channel to the kernel.

In embodiments of the present invention, access to files by processes is restricted by rules based on process compartments. Reference is now made to FIG. 4 that depicts an exemplary file system to which access is controlled by rules based on process compartments. This file system is organized according to a subdirectory structure. The highest component of this file system is the root directory (referred to as root 401). Underneath root 401, several subdirectories are shown including /apache 402, /lib 403, /etc 404. It shall be appreciated that any number of subdirectories could exist at any level of this file system. However, the number of subdirectories shown in FIG. 4 is limited to aid the reader's understanding of embodiments of the present invention. Additionally, several subdirectories are shown underneath /apache 402 (/apache/conf 405 and /apache/logs 406). As is well known in the art, the pathname to a file in a subdirectory is given by the various subdirectories. For example, the pathname for the file "/apache/conf/user0146.1ogs" is /apache/conf 406. The pathname and filename may be passed to a function or a system call to perform various access operations such as opening the file, reading from the file, writing to the file, renaming the file, deleting the file, and/or the like.

TABLE I, below, sets forth a number of exemplary rules that may be included in database 316 to control access to this exemplary file system consistent with the teachings of the present invention:

TABLE I

| Rule No. | Compartment | Pathname | Access |
|---|---|---|---|
| 1 | WEB | /apache/conf | READ |
| 2 | WEB | /apache/logs | READ, WRITE |
| 3 | WEB | / | NONE (no access) |
| 4 | SYSTEM | / | READ, WRITE |

The rules of TABLE I define the permissions given to any process belonging to WEB compartment 301 and SYSTEM compartment 303 to access files within root directory 401 and files within the /apache/conf 405 and /apache/logs 406 subdirectories. For example, a process that belongs to WEB compartment 301 is permitted to read any file within /apache/conf 405 and is allowed to read or write to any file within /apache/logs 406. However, processes belonging to WEB compartment 301 are not permitted any access to files within root directory 401. A process in SYSTEM compartment 303 is permitted read and write access to files within root directory 401.

The rules set forth in TABLE I may be stored in database 316 in any form. However, it is advantageous to store the rules in a manner that parallels the subdirectory structure of this file system. For example, database 316 may include a series of data structures for each subdirectory of file system 300. The data structures for each subdirectory may contain the rules pertaining to the respective subdirectories. Also, the data structures may form a linked list structure. Specifically, the data structures may contain a pointer to its parent subdirectory and a pointer to each child subdirectory. By organizing the rules in this preferable manner, security module 320 may search the database in an efficient manner by traversing the data structures according to the pathname of the file to be accessed. It shall be appreciated that other mechanisms may be utilized in lieu of a pointer approach. For example, a relational database structure may be utilized to organize rules according to the structure of the file system.

Additionally, it is advantageous to minimize the number of rules stored in database 316. According to embodiments of the present invention, a default rule may be placed in root directory 401 for compartments. The default rule is applied until another rule is specified at a data structure associated with lower subdirectory. The specific rule in the data structure associated with the lower subdirectory is applied to every child subdirectory thereafter until another rule is located. According to the exemplary rules given in TABLE I, the default rule for a process belonging to WEB compartment 301 is no access. More specific rules are provided for /apache/conf 405 and /apache/logs 406. By applying this approach, a process belonging to WEB compartment 301 is allowed access to read from every file in /apache/conf 405 and every child subdirectory associated with /apache/conf 405. Likewise, a process belonging to WEB compartment 301 is allowed access to read from and write to every file in /apache/logs 406 and every child subdirectory associated with /apache/logs 406.

According to embodiments of the present invention, security module 320 determines which rules apply based on the compartment identifier of the process. If no rules are located in rule database 316, access is permitted by default. If one or more rules apply, security module 320 preferably utilizes the most specific rule. Specifically, security module 320 first examines the rules to determine whether a specific rule applies to the particular file. If such a rule is located, it is applied. If not, security module 320 examines the lowest subdirectory associated with the file that is defined by the pathname. If a rule is provided for that subdirectory, it is applied. If not, security module 320 successively searches for a rule at each higher parent subdirectory until a rule is located or root directory 401 is reached.

For example, a process belonging to WEB compartment 301 may attempt to read /apache/conf/httpd.conf. A number of rules (Rules 1, 2, and 3) exist for WEB compartment 301. Accordingly, the most specific rule is applied. The rule pertaining to the lowest subdirectory, /apache/conf 405, is applied, i.e. Rule 1, because no rule explicitly exists for apache/conf/httpd.conf. Security module 320 permits access on the basis of Rule 1. Later, the same process belonging to WEB compartment 301 may attempt to write to /apache/conf/httpd.conf. As discussed, Rule 1 applies. In this case, security module 320 does not permit access to the file, because only READ access is permitted by Rule 1.

The same process belonging to WEB compartment 301 may attempt to write to /etc/passwd. A number of rules (Rules 1, 2, and 3) exists for WEB compartment 301. A specific rule is not provided for the file. Accordingly, security module 320 examines the lowest subdirectory defined by the pathname. No rule applies for /etc 404 for WEB compartment 301. Security module 320 searches the parent of /etc 404 which is root directory 401. Security module 320 locates Rule 3 (no access) which is associated with root directory 401. Accordingly, access is not permitted.

It shall be appreciated that embodiments of the present invention provide several advantages. First, the use of a database to retain access information related to compartments greatly simplifies security management. Specifically, it is not necessary to apply and validate access information to each file. Synchronization issues are significantly reduced, since access information need not be modified for each additional or deleted file. The amount of access information is significantly reduced, because rules are based on subdirectories instead of based on individual files. Structuring the database of rules to parallel the subdirectory structure of the file system allows for efficient access to rules of the database by the kernel. Also, structuring the database in this manner simplifies maintenance of rules by a system administrator. Additionally, it shall be appreciated that embodiments of the present invention are compatible with known file system formats. Specifically, embodiments of the present invention may be implemented without modifying the file structure of files, because a database is utilized that is distinct from the files. Accordingly, embodiments of the present invention allow platforms to implement security procedures without requiring modification of the user-space applications or modification of their file systems.

What is claimed is:

1. A method for controlling access to a file by a process, said method comprising:
   receiving a request from said process to access said file, said process being associated with a compartment implemented on an operating system;
   determining an identifier of said compartment; and
   searching for access rules defining whether processes associated with particular compartments are permitted to access certain file resources, said rules retained in a database in a hierarchical manner that parallels a subdirectory structure of a file system containing said file;
   wherein said request includes a filename containing a path identifier, said path identifier specifying a plurality of subdirectories, and wherein said step of searching includes the sub-steps of:
   (a) searching said database according to a lowest subdirectory of said plurality of subdirectories for an access rule applicable to said compartment;
   (b) when an access rule is found in step (a), proceeding to step (e);
   (c) searching said database according a next higher subdirectory of said plurality of subdirectories for an access rule applicable to said compartment; and
   (d) repeating step (c) until the first event of the following events occurs:
      (i) an access rule applicable to said compartment is located;
      (ii) said database is searched according to a root directory;
   (e) when an access rule applicable to said compartment is located, providing access to said file when said access rule applicable to said compartment allows access.

2. The method of claim 1 wherein said step of searching further comprises:
   (f) when an access rule applicable to said compartment is not located, providing access to said file.

3. The method of claim 1 wherein said file is stored on a file system that possesses a subdirectory structure, and wherein said database is structured to retain access rules in a hierarchical manner that parallels the subdirectory structure of said file system.

4. A method for controlling access to a file by a process, said method comprising:
   receiving a request from said process to access said file stored in a file system having a subdirectory structure, said process being associated with a compartment implemented on an operating system;
   determining an identifier of said compartment;
   searching for access rules defining whether processes associated with particular compartments are permitted to access certain file, said rules retained in a database structured in a hierarchical manner that parallels the subdirectory structure; and
   if said database does not include an access rule for a subdirectory containing said file, determining permission for said process to access said file according to an access rule for a parent directory of said subdirectory, and accessing said file if permitted.

5. The method of claim 4, wherein the database does not include an access rule for each subdirectory of the file system.

6. The method of claim 4, wherein said request includes a filename containing a path identifier specifying a plurality of subdirectories, and wherein the searching includes traversing a linked list structure of the access rules in the database according to the plurality of subdirectories of the path identifier.

* * * * *